United States Patent [19]
Ditson

[11] Patent Number: 5,933,075
[45] Date of Patent: Aug. 3, 1999

[54] SYSTEM FOR DISABLING A SPEEDING VEHICLE IN A SAFE EFFICIENT AND REMOTE MANNER

[76] Inventor: Robert D. Ditson, 23432 N. Shore Dr., Edwardsburg, Mich. 49112

[21] Appl. No.: 09/116,977

[22] Filed: Jul. 16, 1998

[51] Int. Cl.⁶ .................................................. B60R 25/10
[52] U.S. Cl. ...................... 340/426; 340/425.5; 180/167; 180/287; 307/10.3; 307/10.5
[58] Field of Search ................. 340/425.5, 426, 340/430, 936, 825.31, 825.36, 825.57; 180/167, 287; 307/10.2, 10.3, 10.5; 455/404; 701/2

[56] References Cited

U.S. PATENT DOCUMENTS

| | | | |
|---|---|---|---|
| 4,067,411 | 1/1978 | Conley et al. | 340/426 |
| 4,619,231 | 10/1986 | Stolar et al. | 123/333 |
| 4,878,050 | 10/1989 | Kelley | 340/825.06 |
| 4,893,240 | 1/1990 | Karkouti | 701/2 |
| 5,276,728 | 1/1994 | Pagliaroli et al. | 455/404 |
| 5,382,948 | 1/1995 | Richmand | 340/825.36 |
| 5,503,059 | 4/1996 | Pacholok | 89/1.11 |
| 5,525,988 | 6/1996 | Perkins et al. | 342/4 |
| 5,828,297 | 10/1998 | Banks et al. | 340/426 |

*Primary Examiner*—Jeffery A. Hofsass
*Assistant Examiner*—Van T. Trieu

[57] ABSTRACT

A system for disabling a speeding vehicle comprising a hand held code transmitter having a trigger to activate a output transmitter to send out a unique signal. A vehicle has an engine with an acceleration cable, a mechanism for disabling the engine when power is received, and a control module having a receiver. The control module is coupled to an antennae for receiving the unique signal. The control module is further coupled to a battery. The control module reacts to the unique signal and in turn responds with power to the mechanism for disabling the engine.

5 Claims, 2 Drawing Sheets

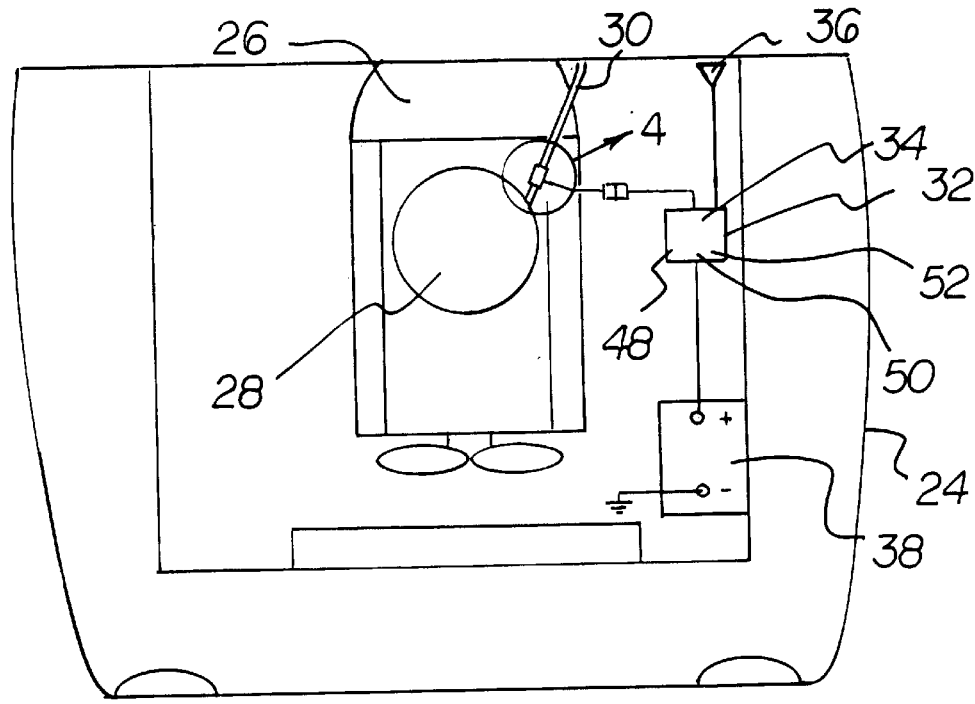
FIG 3
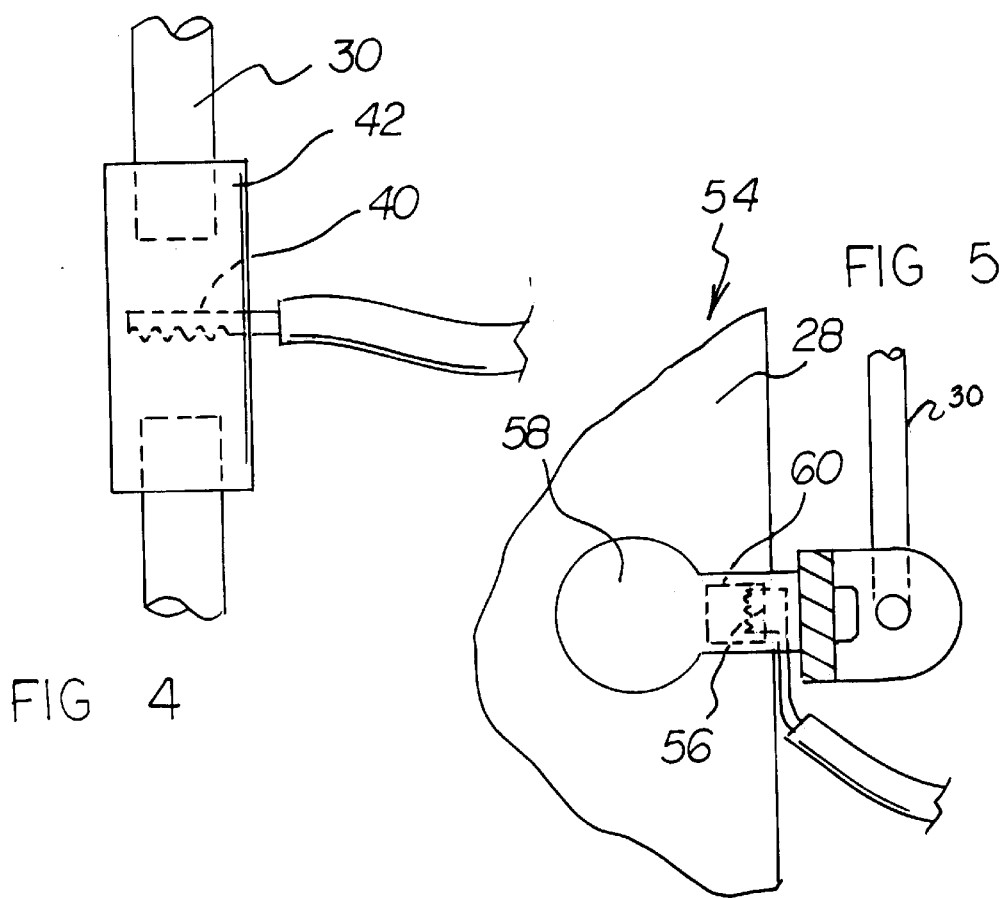
FIG 4
FIG 5

SYSTEM FOR DISABLING A SPEEDING VEHICLE IN A SAFE EFFICIENT AND REMOTE MANNER

BACKGROUND OF THE INVENTION

1. Field of the Invention

The present invention relates to a system for disabling a speeding vehicle in a safe, efficient and remote manner and more particularly pertains to disabling a speeding vehicle to promote highway safety.

2. Description of the Prior Art

The use of vehicle and associated components of various designs and configurations is known in the prior art. More specifically, vehicle and associated components of various designs and configurations heretofore devised and utilized for the purpose of controlling vehicles and arresting speeders through various methods are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,503,059 to Pacholok discloses a vehicle disabling device and method. U.S. Pat. No. 5,293,527 to Sutton et al. discloses a remote vehicle disabling system. U.S. Pat. No. 5,276,728 to Pagliaroli et al. discloses a remotely activated automobile disabling system. U.S. Pat. No. 5,412,370 to Berman et al. discloses a car theft prevention device. Lastly, U.S. Pat. No. 4,878,050 to Kelly discloses a motor vehicle remote control system.

In this respect, the system for disabling a speeding vehicle in a safe, efficient and remote manner according to the present invention substantially departs from the conventional concepts and designs of the prior art, and in doing so provides an apparatus primarily developed for the purpose of disabling a speeding vehicle to promote highway safety.

Therefore, it can be appreciated that there exists a continuing need for a new and improved system for disabling a speeding vehicle in a safe, efficient and remote manner which can be used for disabling a speeding vehicle to promote highway safety. In this regard, the present invention substantially fulfills this need.

SUMMARY OF THE INVENTION

In view of the foregoing disadvantages inherent in the known types of vehicle and associated components of various designs and configurations now present in the prior art, the present invention provides an improved a system for disabling a speeding vehicle in a safe, efficient and remote manner. As such, the general purpose of the present invention, which will be described subsequently in greater detail, is to provide a new and improved a system for disabling a speeding vehicle in a safe, efficient and remote manner and method which has all the advantages of the prior art and none of the disadvantages.

To attain this, the present invention essentially comprises a hand held code transmitter which is in the form a gun with a barrel having an output transmitter. The code transmitter also has a handle portion for being held by a law enforcement officer to stop speeding vehicles. The code transmitter has a trigger to activate the output transmitter which would send out a unique signal through free space. The code transmitter further has a key pad for entering the unique code, possibly in the form of a license plate or V.I.N. number to transmit a unique signal. A vehicle has an engine with a carburetor or any other type of fuel metering device and an accelerator cable operable by a driver to vary the input of fuel by the carburetor to the engine to thereby control the speed of the vehicle. A control module is located within the vehicle adjacent to the engine. The control module has a receiver. The control module is coupled to an antennae for receiving the unique signals from the transmitter and the control module is also coupled to a battery. The control module is further coupled to a resister which is located in a melt away portion of the accelerator cable, upon the receipt of power from the control module via the battery, the resistor will heat the melt away portion disconnecting the acceleration cable and disabling the vehicle.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved system for disabling a speeding vehicle in a safe, efficient and remote manner which have all the advantages of the prior art vehicle and associated components of various designs and configurations and none of the disadvantages.

It is another object of the present invention to provide new and a improved system for disabling a speeding vehicle in a safe, efficient and remote manner which may be easily and efficiently manufactured and marketed.

It is further object of the present invention to provide a new and improved system for disabling a speeding vehicle in a safe, efficient and remote manner which are of durable and reliable constructions.

An even further object of the present invention is to provide a new and improved system for disabling a speeding vehicle in a safe, efficient and remote manner which are susceptible of a low cost of manufacture with regard to both materials and labor, and which accordingly are then susceptible of low prices of sale to the consuming public, thereby making such a system for disabling a speeding vehicle in a safe, efficient and remote manner economically available to the buying public.

Still yet another object of the present invention is to provide a new and improved system for disabling a speeding vehicle in a safe, efficient and remote manner which provide in the apparatuses and methods of the prior art some of the advantages thereof, while simultaneously overcoming some of the disadvantages normally associated therewith.

Even still another object of the present invention is to disable speeding vehicle to promote highway safety.

Lastly, it is an object of the present invention to provide a new and improved system for disabling a speeding vehicle comprising a hand held code transmitter having a trigger to activate a output transmitter to send out a unique signal. A vehicle has an engine with an acceleration cable, a mechanism for disabling the engine which react upon the receipt of power and a control module having a receiver. The control module is coupled to an antennae for receiving the unique signal. The control module is further coupled to a battery. The control module reacts to the unique signal and in turn responds with power to the mechanism for disabling the engine.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top elevational view of the engine of the automobile with the engine, control module and other components useable with the transmitter of the present invention.

FIG. 4 is an enlarged schematic illustration taken at circle 4 of FIG. 3.

FIG. 5 is a schematic illustration of the ball and socket connector of the carburetor.

The same reference numerals refer to the same parts through the various Figures.

DESCRIPTION OF THE PREFERRED EMBODIMENT

Figure 1:
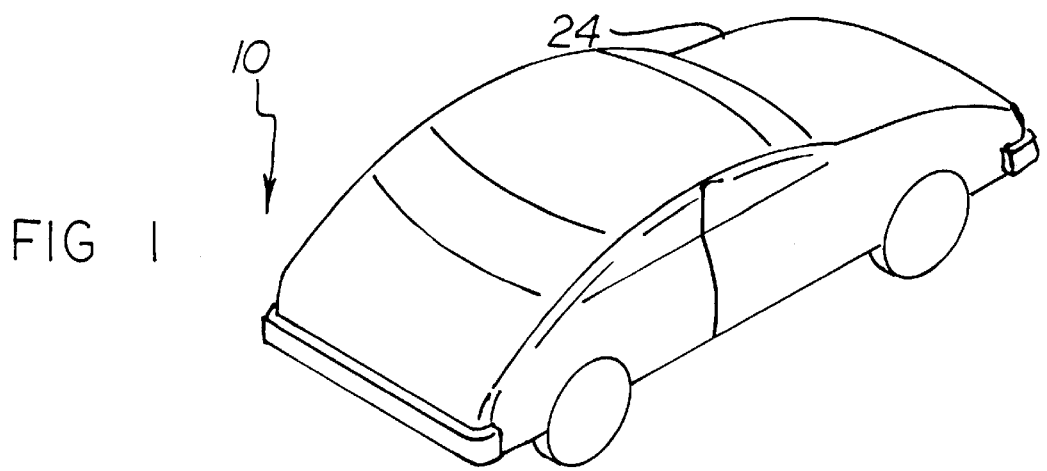
FIG. 1 is a perspective view of the preferred embodiment of the system for disabling a speeding vehicle in a safe, efficient and remote manner constructed in accordance with the principles of the present invention.

With reference now to the drawings, and in particular to FIG. 1 thereof, the preferred embodiment of the new and improved system for disabling a speeding vehicle in a safe, efficient and remote manner embodying the principles and concepts of the present invention and generally designated by the reference numeral 10 will be described.

The present invention, the new and improved system for disabling a speeding vehicle in a safe, efficient and remote manner is comprised of a plurality of components. Such components in their broadest context include a transmitter, a control module, and a mechanism for disabling an engine. Such components are individually configured and correlated with respect to each other so as to attain the desired objective.

Figure 2:
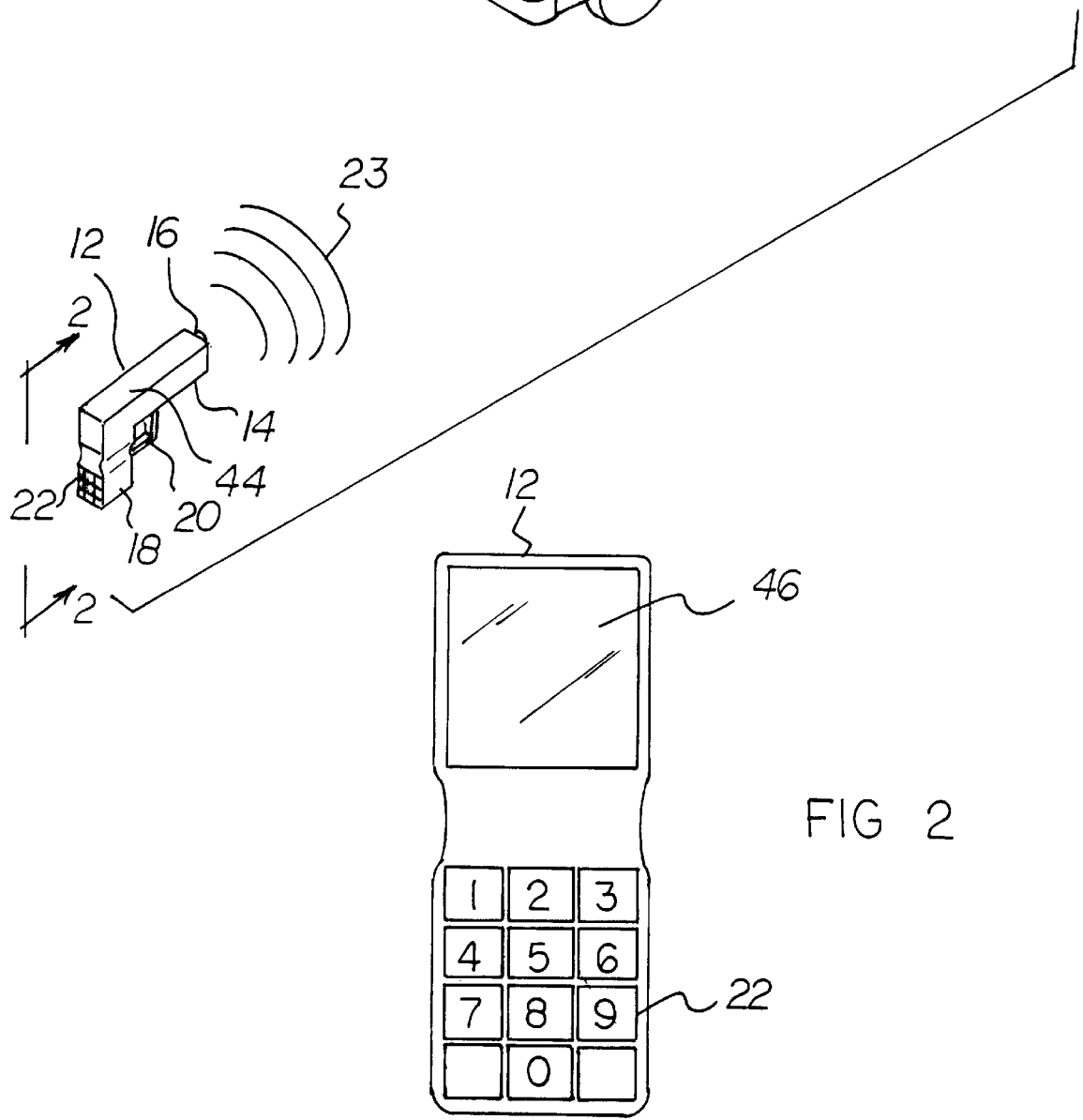
FIG. 2 is a end elevational view of the handle held code transmitter shown in FIG. 1 illustrating the keypad and digital read out screen.

More specifically, the present invention essentially comprises a hand held code transmitter 12 which is in the form of a gun with a barrel 14 having an output transmitter 16. The code transmitter also has a handle portion 18 for being held by a law enforcement officer to stop speeding vehicles. As shown in FIGS. 1 & 2, the code transmitter has a trigger 20 to activate the output transmitter which would send out a unique signal through free space. The code transmitter further has a key pad 22 for entering a unique code, possibly in the form of a license plate number, to transmit a unique signal 23.

As shown in FIG. 3, a vehicle 24 has an engine 26 with a carburetor 28 and a accelerator cable 30 operable by a driver to vary the input of fuel by the carburetor to the engine to thereby control the speed of the vehicle.

A control module 32 is located within the vehicle adjacent to the engine. The control module has a receiver 34. As seen in FIG. 3 the control module is coupled to an antennae 36 for receiving the unique signals from the transmitter and the control module is also coupled to a battery 38. The control module is further coupled to a resister 40 which is located in a melt away portion 42 of the accelerator cable, upon the receipt of power from the control module via the battery, the resistor will heat the melt away portion disconnecting the acceleration cable and disabling the vehicle.

The code transmitter could be adapted with a code receiver 44 and a digital read out screen 46 which could together receive and display the unique code from a code transmitter 48 in the control module. This way the control module would emit the unique code which would be detected by the code receiver, displayed on the digital read out screen and could then be enter into the keypad which would in turn send a unique signal to disable the vehicle. The control module could also have a ohm sensor 50 and a timer 52.

Furthermore, another possible embodiment could be a ball in socket disabling means 54 in the carburetor as seen in FIG. 5. This ball in socket disabling means would receive power from the control module and would also have a resistor 56 that would, when heated by the power, release a ball 58 by disconnecting a melt away portion 60 away. This ball would then melt away thereby disconnecting the accelerator cable and disabling the vehicle. Note FIGS. 4 & 5.

The present invention is a law enforcement tool that permits the police to disable motor vehicles in a remote wireless fashion. One primary application for this system would be to disable motor vehicles when drivers attempt to evade police pursuit. The proposed system is suggested to make use of an encoded radio transmission and reception method of wireless operation. The invention contemplates the inclusion of a disable button. The appealing features of the present invention is the use of the encoded remote control transmission and reception method for disabling the accelerator cables of a fleeing vehicle, thereby providing the police with a ready means of limiting the dangers of a high-speed highway pursuit.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new and improved system for disabling a speeding vehicle in a safe, efficient and remote manner comprising, in combination:

a hand held code transmitter, the code transmitter being in the form a gun with a barrel having an output transmitter, the code transmitter also having a handle portion for being held by a law enforcement officer to stop speeding vehicles, the code transmitter also having a trigger to activate the output transmitter which would send out a unique signal through free space, a key pad for entering a unique code, possibly in the form of a license plate number, to transmit a unique signal;

a vehicle having an engine with a carburetor and an accelerator cable operable by a driver to vary the input of fuel by the carburetor to the engine to thereby control the speed of the vehicle;

a control module located within the vehicle adjacent to the engine, the control module having a receiver, the control module is coupled to an antennae for receiving the unique signals from the transmitter and the control module is coupled to a battery, the control module is also coupled to a resistor which is located in a melt away portion in the accelerator cable, upon the receipt of power from the control module, via the battery, the resistor will heat the melt away portion disconnecting the acceleration cable and disabling the vehicle.

2. A system for disabling a speeding vehicle comprising a hand held code transmitter having a trigger to activate an output transmitter to send out a unique signal, the system comprising a vehicle having an engine with an acceleration cable, a mechanism for disabling the engine when power is received, and a control module having a receiver, the control also having an antennae for receiving the unique signal, the control module being further coupled to a battery, the control module reacts to the unique signal and in turn responds with power to the mechanism for disabling the engine;

wherein the mechanism for disabling the engine comprises a resistor coupled to the control module, wherein the resistor is placed in a meltable portion of the acceleration cable whereby the resistor upon receipt of power from the control module via the battery will cause the resistor to heat and disconnect the meltable portion of the acceleration cable thereby disabling the engine.

3. The system for disabling a speeding vehicle as set forth in claim 2, wherein the code transmitter having the form of a gun with a barrel, the barrel having the output transmitter, the code transmitter further having a handle portion.

4. A system for disabling a speeding vehicle comprising a hand held code transmitter having a trigger to activate a output transmitter to send out a unique signal, the system comprising a vehicle having an engine with an acceleration cable, a mechanism for disabling the engine when power is received, and a control module having a receiver, the control also having an antennae for receiving the unique signal, the control module being further coupled to a battery, the control module reacts to the unique signal and in turn responds with power to the mechanism for disabling the engine;

wherein the mechanism for disabling the engine comprises a ball in a socket disabling means in a carburetor of the vehicle, the ball in the socket disabling means receiving power from the control module and having a resistor having a melt away portion, wherein the melt away portion of the resistor melting away when heated by the power source to release the ball and thereby disconnect the accelerator cable and disabling the vehicle.

5. The system for disabling a speeding vehicle as set forth in claim 4, wherein the code transmitter having the form of a gun with a barrel, the barrel having the output transmitter, the code transmitter further having a handle portion.

* * * * *